(12) United States Patent
Morie

(10) Patent No.: US 10,778,340 B2
(45) Date of Patent: Sep. 15, 2020

(54) DIGITAL COHERENT RECEIVER AND SKEW ADJUSTMENT METHOD THEREOF

(71) Applicant: NEC Corporation, Minato-ku, Tokyo (JP)

(72) Inventor: Masao Morie, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/343,070

(22) PCT Filed: Oct. 30, 2017

(86) PCT No.: PCT/JP2017/039091
§ 371 (c)(1),
(2) Date: Apr. 18, 2019

(87) PCT Pub. No.: WO2018/084106
PCT Pub. Date: May 11, 2018

(65) Prior Publication Data
US 2020/0052795 A1    Feb. 13, 2020

(30) Foreign Application Priority Data
Nov. 2, 2016 (JP) .................................. 2016-215019

(51) Int. Cl.
*H04B 10/61* (2013.01)
*H04B 10/079* (2013.01)
(Continued)

(52) U.S. Cl.
CPC ... *H04B 10/6161* (2013.01); *H04B 10/07951* (2013.01); *H04B 10/07953* (2013.01);
(Continued)

(58) Field of Classification Search
None
See application file for complete search history.

(56) References Cited

U.S. PATENT DOCUMENTS 7,522,842 B1 *   4/2009   McNicol ............ H04B 10/2916
                                              398/157
2010/0209121 A1 * 8/2010   Tanimura ............ H04B 10/611
                                              398/202
(Continued)

FOREIGN PATENT DOCUMENTS

JP     2010-193204 A     9/2010
JP     2011-199687 A    10/2011
(Continued)

OTHER PUBLICATIONS

International Search Report for PCT Application No. PCT/JP2017/039091, dated Jan. 16, 2018.

*Primary Examiner* — Darren E Wolf

(57) ABSTRACT

A skew adjustment method and a digital coherent receiver which can achieve skew adjustment without using a fixed pattern for skew detection are provided. A digital coherent receiver (100) includes: a chromatic dispersion adder (103) that adds chromatic dispersion to the optical multiplexed signal; a skew adjuster (201) that sets a quantity of skew adjustment for each of the plurality of channel signals obtained by detecting the optical multiplexed signal; and a skew controller (204) that is configured to, while monitoring signal quality of a reception signal obtained from the plurality of channel signals skew-adjusted, search for a quantity of skew adjustment at which the signal quality is made better.

15 Claims, 4 Drawing Sheets

(51) Int. Cl.
*H04J 14/06* (2006.01)
*H04B 10/60* (2013.01)

(52) U.S. Cl.
CPC .............. *H04J 14/06* (2013.01); *H04B 10/60* (2013.01); *H04B 10/61* (2013.01); *H04B 10/616* (2013.01)

(56) References Cited

U.S. PATENT DOCUMENTS

| | | | |
|---|---|---|---|
| 2011/0097085 A1* | 4/2011 | Oda | H04B 10/2569 398/65 |
| 2011/0229127 A1 | 9/2011 | Sakamoto et al. | |
| 2012/0020660 A1 | 1/2012 | Le Taillandier De Gabory et al. | |
| 2012/0069854 A1* | 3/2012 | Suzuki | H04B 10/611 370/465 |
| 2012/0263456 A1* | 10/2012 | Tanaka | H04B 10/5055 398/25 |

FOREIGN PATENT DOCUMENTS

| | | |
|---|---|---|
| JP | 2012-524425 A | 10/2012 |
| JP | 2012-222733 A | 11/2012 |

\* cited by examiner

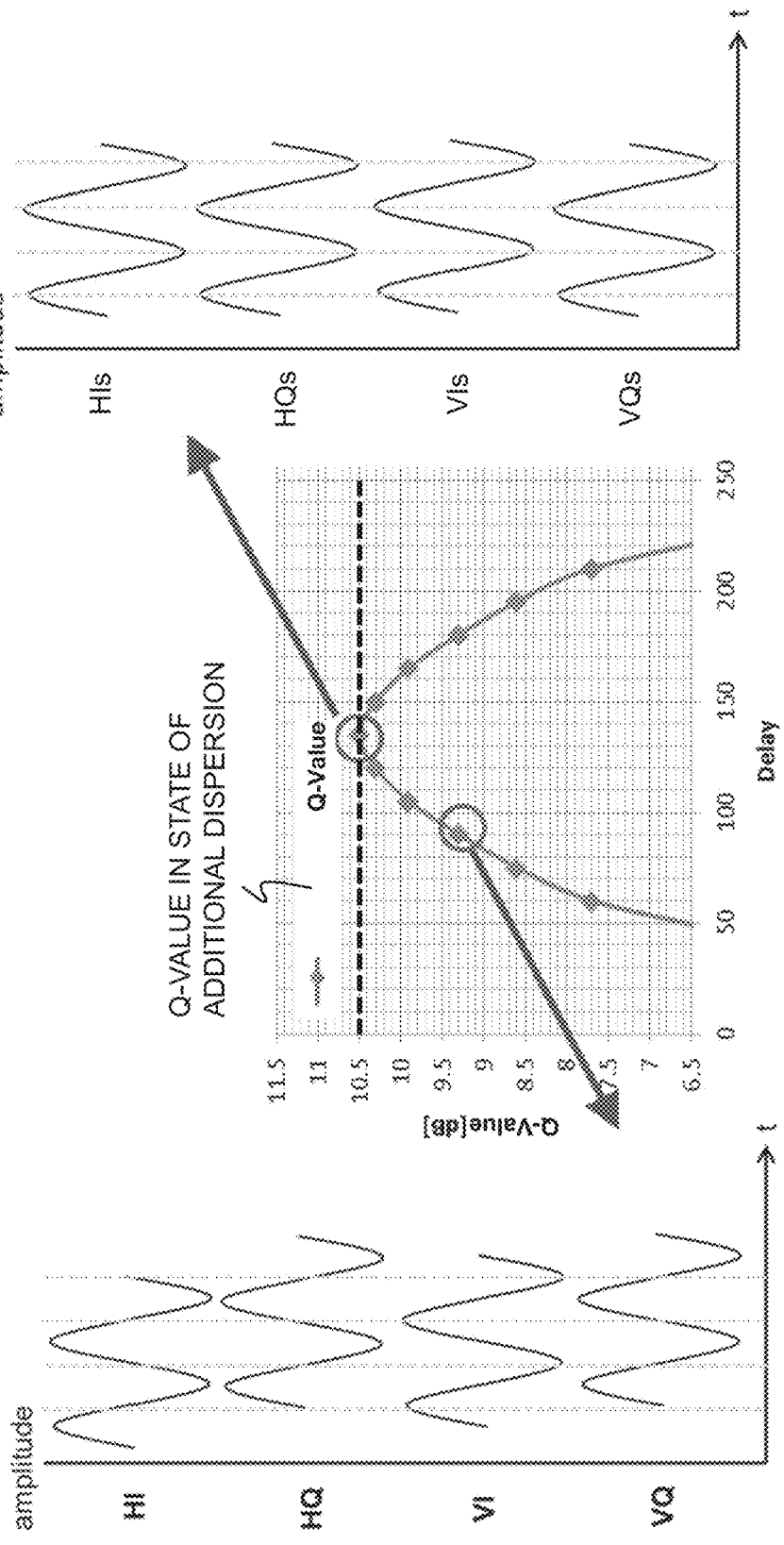

DIGITAL COHERENT RECEIVER AND SKEW ADJUSTMENT METHOD THEREOF

This application is a National Stage Entry of PCT/JP2017/039091 filed on Oct. 30, 2017, which claims priority from Japanese Patent Application 2016-215019 filed on Nov. 2, 2016, the contents of all of which are incorporated herein by reference, in their entirety.

TECHNICAL FIELD

The present invention relates to a receiver in an optical transmission system, and more particularly to a receiver and its skew adjustment technique in digital coherent optical communication.

BACKGROUND

In the digital coherent transmission, signals modulated by existing digital modulation can be allocated to each of two orthogonal polarization components (V, H). For example, in the case where each of the two polarization components V and H includes an I (in-phase) channel and a Q (quadrature) channel, polarization multiplexed light including a total of four channels (HI, HQ, VI and VQ) can be transmitted through an optical fiber.

On the receiving side, the polarization multiplexed light arriving through the optical fiber is demultiplexed for each polarization, and the I channel component and the Q channel component are separated from each polarized light to detect four channel (HI, HQ, VI and VQ) signals. In general, a digital coherent receiver includes a coherent receiving circuit that detects four channel components (HI, HQ, VI, and VQ) from the above-described polarization multiplexed light, and a digital signal processor that converts the four channel signals into digital signals and performs various kinds of signal processing including phase compensation, skew compensation, demodulation, and the like.

In particular, it is considered that skew between channel signals generated inside the receiver may be caused by unequal optical path lengths in the receiver, unequal physical lengths of electrical wiring connecting an optoelectronic converter and a DSP, variations in characteristics of the optoelectronic converters and AD (Analog-to-Digital) converters, and the likes. It is almost impossible to physically eliminate such inter-signal skew. However, skew between the above-mentioned four channel signals would affect signal reproduction by digital signal processing to impair excellent characteristics as a coherent receiver. There have been proposed various techniques for compensating skews by digital signal processing.

For instance, PTL 1 discloses a digital coherent receiver that detects skew between channel signals and controls a skew adjustment value of each channel signal based on detected skew values. PTL 2 discloses a polarization multiplexing transponder that detects skew between parallel signals by comparing predetermined amplitude patterns imprinted to each of the parallel signals to perform skew compensation.

CITATION LIST

Patent Literature

[PTL 1] JP2011-199687A
[PTL 2] JP2012-524425A

SUMMARY

Technical Problem

The above-mentioned PTL 1 does not specifically disclose a skew detection method between channel signals. PTL 2 discloses a method of detecting skew by comparing amplitude pattern imprinted at regular intervals to each of parallel signals at the reception side. Normally, the transmitting side transmits a fixed pattern or the like, and the receiving side detects phase differences of the fixed pattern between the parallel signals to perform the skew adjustment. Therefore, it is necessary to separately provide functions of transmitting the fixed patterns for skew detection at the transmitting side and of detecting the fixed patterns at the receiving side, resulting in complicated system configuration.

Accordingly, an object of the present invention is to provide a skew adjustment method and a digital coherent receiver that can achieve skew adjustment without using a fixed pattern for skew detection.

Solution to Problem

A digital coherent receiver according to the present invention is a digital coherent receiver for receiving an optical multiplexed signal in which a plurality of channel signals are multiplexed, including: a chromatic dispersion adder that adds chromatic dispersion to the optical multiplexed signal; a skew adjuster that sets a quantity of skew adjustment for each of the plurality of channel signals obtained by detecting the optical multiplexed signal; and a skew controller that is configured to, while monitoring signal quality of a reception signal obtained from the plurality of channel signals skew-adjusted, search for a quantity of skew adjustment at which the signal quality is made better.

A skew adjustment method according to the present invention is a skew adjustment method in a digital coherent receiver for receiving an optical multiplexed signal in which a plurality of channel signals are multiplexed, the method, including: by a chromatic dispersion adder, adding chromatic dispersion to the optical multiplexed signal; by a skew adjuster, setting a quantity of skew adjustment for each of the plurality of channel signals obtained by detecting the optical multiplexed signal; and by a skew controller, while monitoring signal quality of a reception signal obtained from the plurality of channel signals skew-adjusted, searching for a quantity of skew adjustment at which the signal quality is made better.

A program according to the present invention is a program for causing a computer to function as a digital coherent receiver for receiving an optical multiplexed signal in which a plurality of channel signals are multiplexed, the program comprising the steps of: by a chromatic dispersion adder, adding chromatic dispersion to the optical multiplexed signal; by a skew adjuster, setting a quantity of skew adjustment for each of the plurality of channel signals obtained by detecting the optical multiplexed signal; and by a skew controller, while monitoring signal quality of a reception signal obtained from the plurality of channel signals skew-adjusted, searching for a quantity of skew adjustment at which the signal quality is made better.

Effect of Invention

As described above, according to the present invention, skew adjustment can be achieved without using a fixed pattern for skew detection.

BRIEF DESCRIPTION OF DRAWINGS

FIG. 4 is a diagram for explaining a skew adjusting method according to the present example.

DETAILED DESCRIPTION

<Outline of Embodiment>

A new skew adjustment method according to the present invention utilizes a phenomenon that as skew between a plurality of channel signals caused by chromatic dispersion becomes larger, a change in quality of a signal reproduced from the channel signals also increases. More specifically, chromatic dispersion is added to the optical multiplexed signal, thereby generating a state where the signal quality changes sensitively to the magnitude of the skew, in other words, a state where the rate of change of the signal quality is relatively large. By changing the quantity of skew adjustment in such a state, a skew adjustment value with best signal quality can be rapidly determined.

In the digital coherent receiver according to the present exemplary embodiment, a chromatic dispersion adder is provided at the input stage to increase the skew between the plurality of channel signals demultiplexed from the optical multiplexed signal, intentionally generating the state where a change of the signal quality with respect to the skew is relatively large. Under such a state where the rate of change in signal quality is large, the quantity of skew adjustment can be changed to easily determine the optimum quantity of skew adjustment with the best signal quality. Accordingly, it is possible to perform skew adjustment using the input optical multiplexed signal without using a fixed pattern. An exemplary embodiment and an example of the present invention will be described in detail with reference to the drawings.

1. Exemplary Embodiment 1.1) Configuration

Figure 1:
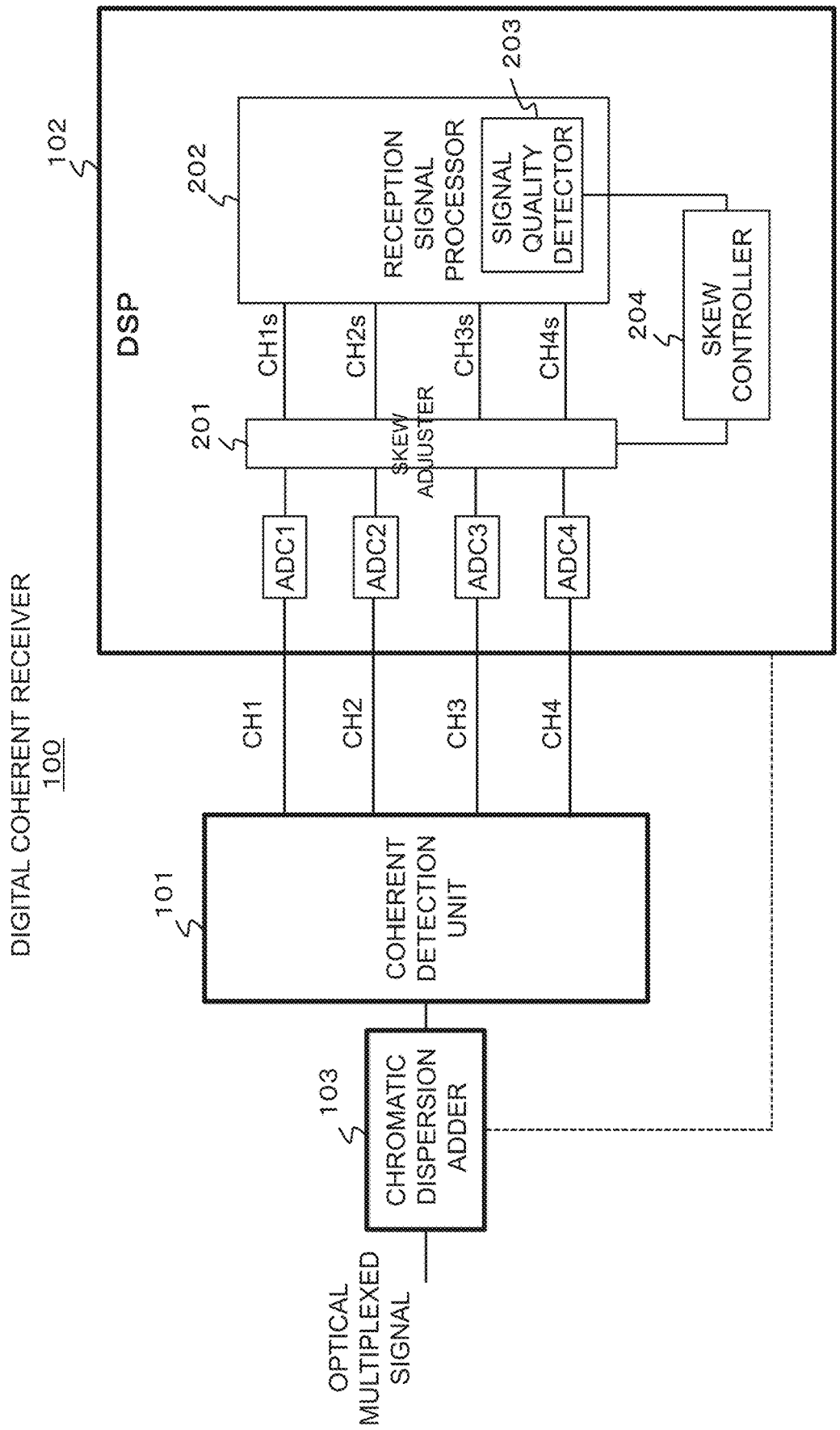
FIG. 1 is a block diagram showing a functional configuration of a digital coherent receiver according to an exemplary embodiment of the present invention.

As shown in FIG. 1, a digital coherent receiver 100 according to an exemplary embodiment of the present invention includes a coherent detection unit 101, a digital signal processor (DSP) 102, and a chromatic dispersion adder 103. It is assumed that the coherent detection unit 101 and the DSP 102 are electrically connected and the coherent detection unit 101 and the chromatic dispersion adder 103 are optically connected. Here, let us take an example where the digital coherent receiver 100 is connected to a transmitter through an optical fiber and receives an optical multi-level modulation signal.

The coherent detection unit 101 demultiplexes the channel signals CH 1 to CH 4 from the input optical multiplexed signal by coherent detection and outputs them as electric signals to the DSP 102 through electric wiring.

The DSP 102 is configured by programs to implement the following functions:

AD (Analog-to-Digital) conversion function: ADC1 to ADC4 sample the four channel signals CH1 to CH4 input from the coherent detection unit 101, respectively, convert the sampled signals to digital, and output the digital signals to the skew adjuster 201.

Skew adjustment function: The skew adjuster 201 performs skew adjustment for each of the digitally converted channel signals CH1 to CH4 according to skew adjustment values set by the skew controller 204 as described later, and then outputs the skew-adjusted channel signals CH1s-CH4s to the reception signal processor 202.

Various signal processing functions: The reception signal processor 202 performs processing such as phase compensation, waveform distortion compensation, demodulation, signal quality detection, etc., by using the channel signals CH1s-CH4s after skew adjustment.

Signal quality detection function: The signal quality detector 203 is a function included in the reception signal processor 202, which detects the quality (bit error rate or the like) of the received signal using the channel signals CH1s-CH4s after the skew adjustment. The detected signal quality is used for skew control as described later.

Skew control function: The skew controller 204 changes a skew adjustment value for each of the channel signals CH1 to CH4 while monitoring the detected signal quality, and sets the skew adjustment values indicating the best signal quality as an optimum value to the skew adjuster 201.

The above-described functions as shown in FIG. 1 are shown as an example restricted to only configuration related to skew adjustment according to the present invention. Accordingly, functional configurations such as phase compensation and demodulation of received data are omitted.

The chromatic dispersion adder 103 is disposed in a preceding stage of the coherent detection unit 101, which adds chromatic dispersion to the input optical multiplexed signal, and outputs it to the coherent detection unit 101. A chromatic dispersion addition element can be used as the chromatic dispersion adder 103 for generating chromatic dispersion in the same direction as the optical fiber through which the optical multiplexed signal propagates. Alternatively, a variable chromatic dispersion element can be also used as the chromatic dispersion adder 103 for adjusting the magnitude of chromatic dispersion (see NTT Technical Journal 2012.2, JP2002-258207A, and the like). The DSP 102 may control the magnitude of chromatic dispersion of the chromatic dispersion adder 103 or a decision on whether chromatic dispersion is added or not. Hereinafter, the skew adjustment operation by the DSP 102 will be described with reference to FIG. 2.

1.2) Operation

Figure 2:
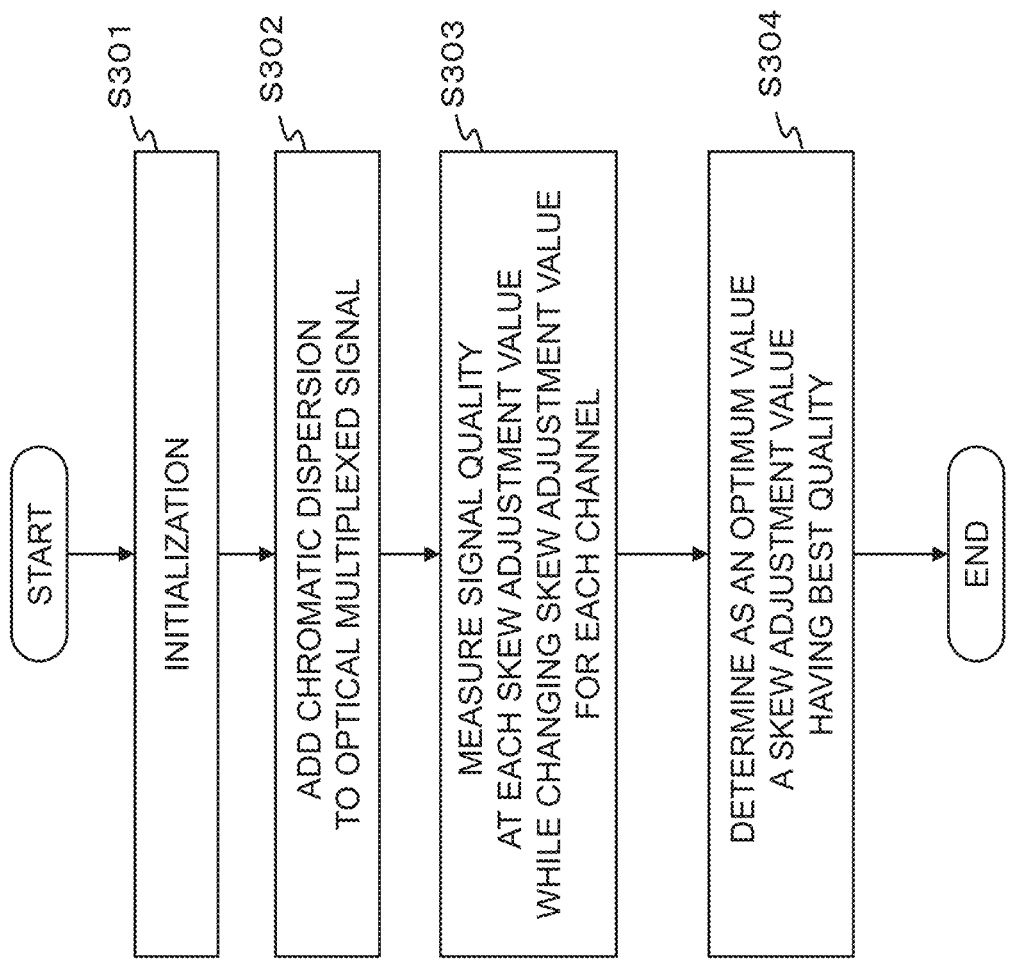
FIG. 2 is a flowchart showing an example of a skew adjusting method according to the present exemplary embodiment.

In FIG. 2, when executing the skew adjustment, the DSP 102 initializes variables indicating skew adjustment values and the signal quality (Operation S301), thereafter controls the chromatic dispersion adder 103 to add chromatic dispersion to the input optical multiplexed signal (Operation S302). The magnitude of the chromatic dispersion is set such that skew between the channel signals is made larger to increase a change in the signal quality with respect to the skew as described above. The optical multiplexed signal to which the chromatic dispersion is added is input to the coherent detection unit 101, and the four channel signals CH1 to CH4 are input to the DSP 102 through the electric wiring. The channel signals CH1 to CH4 are converted into digital signals by ADC1 to ADC4, respectively, and then input to the reception signal processor 202 through the skew adjuster 201 in which the initial value of the skew adjustment value has been set.

The signal quality detector 203 in the reception signal processor 202 detects the signal quality from the skew-adjusted channel signals CH1s to CH4s. The skew controller 204 sequentially changes the skew adjustment values provided to the skew adjuster 201 to determine the signal quality detected at each skew adjustment value (Operation S303). The skew controller 204 determines the skew adjustment values when the measured signal quality shows the best value as the optimum value and sets the optimum skew adjustment values in the skew adjuster 201 (Operation S304).

1.3) Effect

As described above, according to the present embodiment, chromatic dispersion is added to the optical multiplexed signal, which makes the signal quality sensitive to the magnitude of the skew between the channel signals. Under such a sensitive state, the signal quality is measured while changing the quantity of skew adjustment. Accordingly, it is possible to easily determine the quantity of skew adjustment at which the signal quality becomes the best only by observing the signal quality at the receiving side without the transmitting side transmitting any special signal.

2. Example

Hereinafter, it is assumed that an optical multiplexed signal input to the digital coherent receiver is a DP-QPSK (Dual Polarization QPSK) signal and each of two orthogonally polarized waves (H and V) includes I-channel and Q-channel signals. Therefore, the DP-QPSK signal is separated into four channel signals HI, HQ, VI, VQ by coherent detection of each polarized wave.

Figure 3:
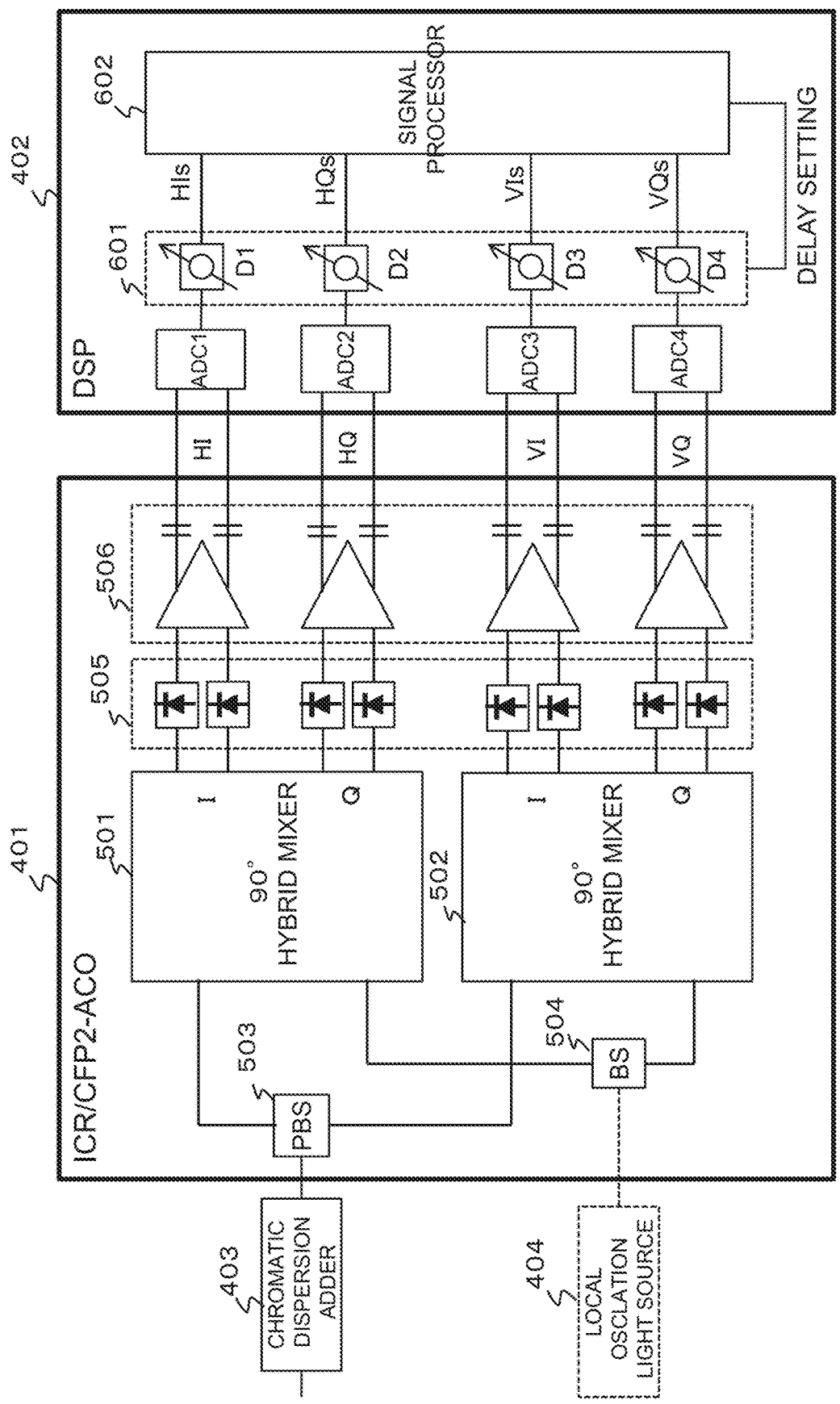
FIG. 3 is a circuit diagram showing a more detailed configuration of the digital coherent receiver according to an example of the present invention.

As illustrated in FIG. 3, a digital coherent receiver 400 according to an example of the present invention includes a coherent detection unit 401, a digital signal processor (DSP) 402, a chromatic dispersion adder 403, and a local oscillation light source 404.

The coherent detection unit 401 is an ICR (Integrated Coherent Receiver) or a receiver conforming to the latest standard CFP2-ACO (Analog Coherent Optics) related to small transceivers. If the coherent detection unit 401 is an ICR, the local oscillation light source 404 is of external type. If it is a CFP2-ACO, the local oscillation light source 404 is of internal type. The coherent detection unit 401 includes two 90° hybrid mixers 501 and 502, a polarization beam splitter (PBS) 503, a beam splitter (BS) 504, an optoelectronic converter section 505 and a trans-impedance amplifier (TIA) section 506.

The chromatic dispersion adder 403 adds chromatic dispersion to the DP-QPSK signal and then outputs it to the PBS 503. The PBS 503 splits the input signal into polarized wave H and polarized wave V, and outputs these split signals to the 90° hybrid mixers 501 and 502, respectively. Furthermore, the local oscillation light source 404 outputs the local light to the BS 504, which then splits the local light into two, which are input to the 90° hybrid mixers 501 and 502, respectively. The 90° hybrid mixer 501 causes the signal light of the polarization H to interfere with the local light to output the I component (HI) and the Q component (HQ). Similarly, the 90° hybrid mixer 502 causes the signal light of the polarization V to interfere with the local light to output the I component (VI) and the Q component (VQ).

The four-channel optical signals HI, HQ, VI, and VQ output from the 90° hybrid mixers 501 and 502 are converted into electric signals by photodiodes (PD) of the optoelectronic converter section 505, respectively, and are then output as four-channel electric signals HI, HQ, VI and VQ to the DSP 402 through the TIA section 506. As described above, internal skew inevitably occurs between the electric signals HI, HQ, VI, and VQ of the four channels due to unequal optical path lengths in the coherent detection unit 401, unequal electrical wiring lengths from the optoelectronic converter section 505 to the TIA section 506, unequal electrical wiring lengths between the coherent detection unit 401 and the DSP 402, and the like. In the present example, due to additional chromatic dispersion by the chromatic dispersion adder 403, larger skew arises between the electric signals HI, HQ, VI and VQ.

The DSP 402 is configured to implement the following functions.

AD conversion function: the respective ADC1 to ADC4 sample the four channel signals HI, HQ, VI and VQ input from the coherent detection unit 401, and convert them into digital signals to output the digital signals to the skew adjuster section 601.

Skew adjustment function: The skew adjuster section 601 performs skew adjustment to the digital-converted channel signals HI, HQ, VI and VQ by using the respectively set quantities of delay, and outputs the skew-adjusted channel signals HIs, HQs, VIs and VQs to the signal processor 602.

Various signal processing functions: The signal processor 602 is provided with the functions of phase compensation, waveform distortion compensation, demodulation, and the like using the channel signals HIs, HQs, VIs and VQs after the skew adjustment. In addition, the signal processor 602 is further provided with a signal quality detection function and a skew control function for searching for the optimum value of delay (Delay) which is a quantity of skew adjustment, as already described in the exemplary embodiment. In this example, it is assumed that bit errors or a bit error rate (BER: Bit Error Rate) is used as a parameter of signal quality. An example of the skew control in the present example will be described below with reference to FIG. 4.

As illustrated in FIG. 4, the four channel signals HI, HQ, VI and VQ are parallel signals inputted from the coherent detection unit 401 to the DSP 402. As described above, the waveforms of the four channel signals HI, HQ, VI and VQ are shifted in time due to the internal skew and additional skew cause by the additional chromatic dispersion of the chromatic dispersion adder 403. If the four channel signals are used as they are, signal reproduction will be accompanied by many bit errors. Accordingly, the skew control function of the signal processor 602 sequentially changes the quantity of delay of one of the channel signals HI and HQ on the polarization H and the quantity of delay of one of channel signals VI and VQ on the polarization V in the skew adjuster section 601. The skew control function of the signal processor 602 monitors bit errors as signal quality (Q-value) when the respective quantities of delay are set (see the Delay-Q graph (solid line) in FIG. 4). In this manner, it is possible to find the quantity of delay when the bit error becomes minimum (when the quality Q value becomes maximum). The Delay value at that time is determined as the optimum value of the quantity of skew adjustment. On the other hand, when chromatic dispersion is not added, almost no change in bit error (Q value) occurs as indicated by the Delay-Q graph (broken line) in FIG. 4.

As described above, according to the present example, assuming that bit errors or a bit error rate is used as a parameter for skew adjustment, intentionally added chromatic dispersion makes a change of bit error sensitive to a skew deviation. In such a sensitive state, the optimum value of skew adjustment is found. Therefore, skew adjustment can be made by only monitoring the bit errors themselves, which eliminates the need for a transmitting side to transmit a predetermined fixed pattern or the like, resulting in extremely high versatility of the skew adjustment.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

This application is based on and claims the benefit of priority from Japanese patent application no. 2016-215019, filed on Nov. 2, 2016, the disclosure of which is incorporated herein in its entirety by reference.

3. Supplementary Notes

Some or all of the above-described embodiments or examples may also be described as follows, but not limited thereto.

(Supplementary Note 1)

A digital coherent receiver comprising:

a chromatic dispersion adder that adds chromatic dispersion to an optical multiplexed signal in which a plurality of channel signals are multiplexed;

a coherent detection unit that is configured to separate the optical multiplexed signal to which the chromatic dispersion is added, into the plurality of channel signals by coherent detection; and a digital signal processing unit that is configured to reproduce a reception signal from the plurality of channels signals by digital signal processing, wherein the digital signal processing unit comprises:

a skew adjusting means that sets a quantity of skew adjustment for each of the plurality of channel signals;

a signal quality detecting means that detects signal quality of the reception signal from the plurality of channel signals skew-adjusted; and a skew control means that is configured to determine, as an optimum value, a quantity of skew adjustment providing best signal quality by changing the quantity of skew adjustment for at least one of the plurality of channel signals while monitoring the signal quality.

(Supplementary Note 2)

The digital coherent receiver according to Supplementary Note 1, wherein the coherent detection unit comprises:

a polarization beam splitter that splits the optical multiplexed signal into first and second polarizations orthogonal to each other;

a 90° hybrid mixer that separates an optical multiplexed signal of each of the split polarizations into in-phase channel and quadrature channel signals; and an output unit that is configured to: convert the in-phase and quadrature channel signals of the first and second polarizations into electric signals; and output the electric signals as the plurality of channel signals to the digital signal processing unit.

(Supplementary Note 3)

The digital coherent receiver according to Supplementary Note 1 or 2, wherein the signal quality of the reception signal is represented by a number of bit errors or a bit error rate.

(Supplementary Note 4)

The digital coherent receiver according to any one of Supplementary Notes 1 to 3, wherein the quantity of skew adjustment is a delay time.

(Supplementary Note 5)

The digital coherent receiver according to any one of Supplementary Notes 1 to 4, wherein skew between the plurality of channel signals is increased by adding the chromatic dispersion to the optical multiplexed signal.

(Supplementary Note 6)

A skew adjustment method in a digital coherent receiver, by a chromatic dispersion adder, adding chromatic dispersion to an optical multiplexed signal in which a plurality of channel signals are multiplexed;

by a coherent detection unit, separating the optical multiplexed signal to which the chromatic dispersion is added, into the plurality of channel signals by coherent detection; and by a digital signal processing unit, setting a quantity of skew adjustment for each of the plurality of channel signals;

detecting signal quality of the reception signal from the plurality of channel signals skew-adjusted; and determining, as an optimum value, a quantity of skew adjustment providing best signal quality by changing the quantity of skew adjustment for at least one of the plurality of channel signals while monitoring the signal quality.

(Supplementary Note 7)

The skew adjusting method according to Supplementary Note 6, wherein the coherent detection unit splits the optical multiplexed signal into first and second polarizations orthogonal to each other; separates an optical multiplexed signal of each of the split polarizations into in-phase channel and quadrature channel signals; and converts the in-phase and quadrature channel signals of the first and second polarizations into electric signals; and outputs the electric signals as the plurality of channel signals to the digital signal processing unit.

(Supplementary Note 8)

The skew adjusting method according to Supplementary Note 6 or 7, wherein the signal quality of the reception signal is represented by a number of bit errors or a bit error rate.

(Supplementary Note 9)

The skew adjusting method according to any one of Supplementary Notes 6 to 8, wherein the quantity of skew adjustment is a delay time.

(Supplementary Note 10)

The skew adjusting method according to any one of Supplementary Notes 6 to 9, wherein skew between the plurality of channel signals is increased by adding the chromatic dispersion to the optical multiplexed signal.

(Supplementary Note 11)

A program for causing a computer to function as a digital coherent receiver having a coherent detection unit that separates an optical multiplexed signal into a plurality of channel signals by coherent detection, the program comprising the steps of:

by a chromatic dispersion adder, adding chromatic dispersion to an optical multiplexed signal in which a plurality of channel signals are multiplexed;

by the coherent detection unit, inputting the plurality of channel signals to which the optical multiplexed signal to which the chromatic dispersion is added are separated by coherent detection;

setting a quantity of skew adjustment for each of the plurality of channel signals;

detecting signal quality of the reception signal from the plurality of channel signals skew-adjusted; and determining, as an optimum value, a quantity of skew adjustment providing best signal quality by changing the quantity of skew adjustment for at least one of the plurality of channel signals while monitoring the signal quality.

(Supplementary Note 12)

The program according to Supplementary Note 11, wherein the signal quality of the reception signal is represented by a number of bit errors or a bit error rate.

(Supplementary Note 13)

The program according to Supplementary Note 11 or 12, wherein the quantity of skew adjustment is a delay time.

(Supplementary Note 14)

The program according to any one of Supplementary Notes 11 to 13, wherein skew between the plurality of channel signals is increased by adding the chromatic dispersion to the optical multiplexed signal.

INDUSTRIAL APPLICABILITY

The present invention is applicable to systems using optical coherent reception.

REFERENCE SIGNS LIST

100 Digital coherent receiver
101 Coherent detection unit
102 Digital signal processor (DSP)
103 Chromatic dispersion adder
201 Skew adjuster
202 Reception signal processor
203 Signal quality detector
204 Skew controller
400 Digital coherent receiver
401 Coherent detection unit
402 Digital Signal processor (DSP)
403 Chromatic dispersion adder
404 Local oscillation light source
501, 502 90° hybrid mixer
503 Polarization beam splitter
504 Beam splitter
505 Optoelectronic converter section
506 Trans-impedance amplifier section
601 Skew adjuster section
602 Signal processor

What is claimed is:

1. A digital coherent receiver for receiving an optical multiplexed signal, comprising:
   a chromatic dispersion adder that adds chromatic dispersion to the optical multiplexed signal to output a first optical multiplexed signal;
   a coherent detector that separates the first optical multiplexed signal into a plurality of channel signals by coherent detection;
   a skew adjuster that sets a quantity of skew adjustment for each of the plurality of channel signals to output a plurality of skew-adjusted channel signals; and
   a skew controller that is configured to:
      control the skew adjuster to change the quantity of skew adjustment for at least one of the plurality of channel signals;
      while monitoring reception signal quality obtained from the plurality of skew-adjusted channel signals, search for a quantity of skew adjustment at which the reception signal quality is made better; and
      determine, an optimum value, a quantity of skew adjustment providing best reception signal quality.

2. The digital coherent receiver according to claim 1, wherein the coherent detector comprises:
   a polarization beam splitter that splits the first optical multiplexed signal into first and second polarizations orthogonal to each other;
   a 90° hybrid mixer that separates an optical multiplexed signal of each of the split polarizations into in-phase channel and quadrature channel signals; and
   an optoelectronic converter that converts the in-phase and quadrature channel signals of the first and second polarizations into four channel electric signals to output the four channel electric signals as the plurality of channel signals to the skew adjuster.

3. The digital coherent receiver according to claim 1, wherein the reception signal quality is represented by a number of bit errors or a bit error rate.

4. The digital coherent receiver according to claim 1, wherein the quantity of skew adjustment is a delay time.

5. The digital coherent receiver according to claim 1, wherein the chromatic dispersion added to the optical multiplexed signal is previously set so as to make the reception signal quality sensitive to the magnitude of the skew between the plurality of channel signals.

6. A skew adjustment method in a digital coherent receiver for receiving an optical multiplexed signal, the method comprising:
   a) by a chromatic dispersion adder, adding chromatic dispersion to the optical multiplexed signal to output a first optical multiplexed signal;
   b) by a coherent detector, separating the first optical multiplexed signal into a plurality of channel signals by coherent detection;
   by at least one processor,
   c) setting a quantity of skew adjustment for each of the plurality of channel signals to output a plurality of skew-adjusted channel signals;
   d) detecting the reception signal quality from the plurality of skew-adjusted channel signals; and
   e) determining, as an optimum value, a quantity of skew adjustment providing best reception signal quality by changing the quantity of skew adjustment for at least one of the plurality of channel signals while monitoring the reception signal quality.

7. The skew adjusting method according to claim 6, wherein the chromatic dispersion added to the optical multiplexed signal is previously set so as to make the reception signal quality sensitive to the magnitude of the skew between the plurality of channel signals.

8. A non-transitory computer-readable medium storing a program for causing a computer to function as a digital coherent receiver for receiving an optical multiplexed signal, the program comprising the steps of:
   a) by a chromatic dispersion adder, adding chromatic dispersion to the optical multiplexed signal to output a first optical multiplexed signal;
   b) by a coherent detector, separating the first optical multiplexed signal into a plurality of channel signals by coherent detection;
   c) by a skew adjuster, setting a quantity of skew adjustment for each of the plurality of channel signals to output a plurality of skew-adjusted channel signals; and
   d) by a skew controller,
      control the skew adjuster to change the quantity of skew adjustment for at least one of the plurality of channel signals;
      while monitoring reception signal quality obtained from the plurality of skew-adjusted channel signals, search for a quantity of skew adjustment at which the reception signal quality is made better; and
      determine, an optimum value, a quantity of skew adjustment providing best reception signal quality.

9. The program according to claim 8, wherein the chromatic dispersion added to the optical multiplexed signal is previously set so as to make the reception signal quality sensitive to the magnitude of the skew between the plurality of channel signals.

10. The skew adjusting method according to claim 6, wherein the b) comprises:
   splitting the first optical multiplexed signal into first and second polarizations orthogonal to each other;
   separating an optical multiplexed signal of each of the split polarizations into in-phase channel and quadrature channel signals; and
   converting the in-phase and quadrature channel signals of the first and second polarizations into four channel electric signals to output the four channel electric signals as the plurality of channel signals.

11. The skew adjusting method according to claim 6, wherein the reception signal quality is represented by a number of bit errors or a bit error rate.

12. The skew adjusting method according to claim 6, wherein the quantity of skew adjustment is a delay time.

13. The non-transitory computer-readable medium according to claim 8, wherein the b) comprises:
   splitting the first optical multiplexed signal into first and second polarizations orthogonal to each other;
   separating an optical multiplexed signal of each of the split polarizations into in-phase channel and quadrature channel signals; and
   converting the in-phase and quadrature channel signals of the first and second polarizations into four channel electric signals to output the four channel electric signals as the plurality of channel signals.

14. The non-transitory computer-readable medium according to claim 8, wherein the reception signal quality is represented by a number of bit errors or a bit error rate.

15. The non-transitory computer-readable medium according to claim 8, wherein the quantity of skew adjustment is a delay time.

* * * * *